United States Patent
Murray

(10) Patent No.: US 11,497,161 B2
(45) Date of Patent: Nov. 15, 2022

(54) CONTROL SYSTEM FOR A MOWER CONDITIONER IMPLEMENT

(71) Applicant: DEERE & COMPANY, Moline, IL (US)

(72) Inventor: Cole L. Murray, Polk City, IA (US)

(73) Assignee: DEERE & COMPANY, Moline, IL (US)

( * ) Notice: Subject to any disclaimer, the term of this patent is extended or adjusted under 35 U.S.C. 154(b) by 727 days.

(21) Appl. No.: 16/511,526

(22) Filed: Jul. 15, 2019

(65) Prior Publication Data
US 2021/0015032 A1  Jan. 21, 2021

(51) Int. Cl.
| | |
|---|---|
| *A01D 34/00* | (2006.01) |
| *A01D 43/10* | (2006.01) |
| *A01D 82/00* | (2006.01) |
| *A01D 34/74* | (2006.01) |

(52) U.S. Cl.
CPC .......... *A01D 34/008* (2013.01); *A01D 34/74* (2013.01); *A01D 43/102* (2013.01); *A01D 43/105* (2013.01); *A01D 82/00* (2013.01)

(58) Field of Classification Search
CPC .... A01D 34/008; A01D 34/74; A01D 43/102; A01D 82/00; A01D 82/02; A01D 43/105
See application file for complete search history.

(56) References Cited

U.S. PATENT DOCUMENTS

| | | | | |
|---|---|---|---|---|
| 4,392,533 A | * | 7/1983 | Bittie | A01D 33/04 |
| | | | | 171/14 |
| 6,119,531 A | * | 9/2000 | Wendte | A01B 79/005 |
| | | | | 73/863.52 |
| 2008/0261670 A1 | * | 10/2008 | Potthast | A01D 43/10 |
| | | | | 460/78 |
| 2013/0059631 A1 | | 3/2013 | Claussen et al. | |
| 2018/0042176 A1 | | 2/2018 | Obropta et al. | |
| 2019/0116733 A1 | | 4/2019 | Wire et al. | |

FOREIGN PATENT DOCUMENTS

| | | | | |
|---|---|---|---|---|
| EP | 2586285 A1 | * 5/2013 | ........... | A01D 43/085 |
| EP | 3366104 A1 | 8/2018 | | |
| WO | WO-2019138278 A1 | * 7/2019 | ........... | A01D 34/006 |

OTHER PUBLICATIONS

European Search Report issued in counterpart application No. 20185054.2 dated Nov. 23, 2020 (07 pages).

* cited by examiner

*Primary Examiner* — Alicia Torres

(57) ABSTRACT

A mower conditioner implement includes a cutting system for cutting crop material, and a crop conditioning system for receiving the cut crop material from the cutting system and conditioning the cut crop material to facilitate drying. An image sensor senses an image of the cut crop material. The image includes a color spectrum of the cut crop material from reflected light emitted from a light source. A computing device compares the color spectrum of the image to a calibrated color measurement to determine an ash content in the cut crop material, and/or a degree of stem conditioning of the cut crop material. The computing device may then communicate the results to an operator, and/or adjust the cutting system or the crop conditioning system based on the ash content or the degree of stem conditioning.

17 Claims, 2 Drawing Sheets

CONTROL SYSTEM FOR A MOWER CONDITIONER IMPLEMENT

TECHNICAL FIELD

The disclosure generally relates to a mower conditioner implement for cutting and conditioning crop material.

BACKGROUND

A mower conditioner implement is coupled to an agricultural machine, and is used to cut and condition crop material, such as but not limited to hay and forage. The mower conditioner implement may be attached to a forward end of the agricultural machine, such as a windrower, which pushes the mower conditioner implement. In other embodiments, the mower conditioner implement may be attached to a rearward end of the agricultural machine, such as a tractor, which pulls the mower conditioner implement.

The mower conditioner implement includes a cutting system that cuts standing crop material in a field, and a crop conditioning system that conditions the cut crop material. The cutting system cuts the crop material at a cutting height relative to the ground surface. If the cutting height is too low, or the angle of the mower conditioner implement is not properly set, ash may be drawn into the cut crop material. The ash has no nutritional value. As such, excessive amounts of ash in the cut crop material may negatively affect the nutritional value of the crop material. However, if the cutting height is set too high, portions of the crop material remain uncut, and are wasted.

As used herein, "crop conditioning", "stem conditioning", and/or "condition crop material" includes processing the cut crop material to bend, crimp, abrade, and/or crack open stem and stalk portions of the cut crop material, and/or at least partially remove a wax material from the cut crop material, to accelerate the release of moisture from the cut crop material and reduce dry-down time of the crop material. The degree or amount of stem conditioning affects the dry-down time. However, overly conditioned crop material may decrease the nutritional content of the crop material. Accordingly, it is desirable to set or position the mower conditioner implement to reduce ash content in the cut crop material, while optimizing harvest and conditioning of the cut crop material to an optimal level for dry-down time and nutritional content.

SUMMARY

A mower conditioner implement is provided. The mower conditioner implement includes a cutting system and a crop conditioning system. The cutting system is operable to cut crop material. The crop conditioning system is operable to receive the cut crop material from the cutting system, and condition the cut crop material to facilitate crop drying and reduce crop dry-down time. The mower conditioner implement further includes an image sensor and a computing device. The image sensor is positioned sense an image of the crop material. The image includes a color spectrum of the cut crop material. The computing device includes a processor and a memory having a crop analysis algorithm stored thereon. The processor is operable to execute the crop analysis algorithm to compare the color spectrum of the image to a calibrated color measurement, in order to determine at least one of an ash content in the cut crop material or a degree of stem conditioning of the cut crop material. The computing device may then adjust at least one of the cutting system or the crop conditioning system based on at least one of the determined ash content or the determined degree of stem conditioning.

In one aspect of the disclosure, a light source is associated with the image sensor. The light source is operable to emit light immediately prior to the image sensor sensing the image of the cut crop material. The color spectrum of the image includes reflected light emitted from the light source. The calibrated color measurement is calibrated to correlate different colors of the color spectrum of the image to different crop characteristics, such as different ash content and/or different degrees of crop conditioning.

In one aspect of the disclosure, the image sensor is disposed downstream of the crop conditioning system relative to a direction of movement of the cut crop material. The image sensed by the image sensor may be considered a post-conditioned image of the cut crop material that has been discharged from the crop conditioning system.

In another aspect of the disclosure, the mower conditioner implement may include a second image sensor. The second image sensor may be disposed downstream of the cutting system and upstream of the crop conditioning system, relative to the direction of movement of the cut crop material. The second image sensor is operable to sense a pre-conditioned image having a color spectrum of the cut crop material discharged from the cutting system, and prior to entering the crop conditioning system.

In another aspect of the disclosure, the mowing implement may include a second light source associated with the second image sensor. The second light source is operable to emit light immediately prior to the second image sensor sensing the pre-conditioned image. The color spectrum of the pre-conditioned image includes reflected light emitted from the second light source.

In one aspect of the disclosure, the first light source and the second light source may be a single light source arranged to emit light for both the light sensor and the second light sensor. Alternatively, the first light source and the second light source may be separate and independent of each other.

In one aspect of the disclosure, the processor is operable to execute the crop analysis algorithm to determine a color difference between the color spectrum of the pre-conditioned image and the color spectrum of the post-conditioned image. The processor may then compare the color difference to the calibrated color measurement to determine the at least one of the ash content of the cut crop material or the degree of stem conditioning of the cut crop material.

In one aspect of the disclosure, the processor is operable to execute the crop analysis algorithm to associate at least one of the pre-conditioned image and the post-conditioned image with data related to the location, date, and time that the pre-conditioned image and the post-conditioned image were sensed respectively, to define a geo-referenced data set. The computing device may then communicate the geo-referenced data set to a remote data storage system.

In one aspect of the disclosure, each of the image sensor and the second image sensor may include at least one of a near-infrared sensor or a red-green-blue color sensor.

In one aspect of the disclosure, the processor is operable to execute the crop analysis algorithm to compare the determined ash content to a maximum allowable ash threshold in order to determine if the determined ash content is less than or equal to the maximum allowable ash threshold, or if the determined ash content is greater than the maximum allowable ash threshold. When the determined ash content is greater than the maximum allowable ash threshold, the computing device may control a cut height of the cutting system relative to a ground surface, and/or control a cutting speed of the cutting system, in order to reduce the ash content.

In one aspect of the disclosure, based on the determined degree of stem conditioning, the processor is operable to execute the crop analysis algorithm to control a conditioning speed of the crop conditioning system, control a conditioning pressure of the crop conditioning system, and/or generate and communicate a signal to a communicator. The signal indicates the determined ash content or the determined degree of crop conditioning. The communicator may include, but is not limited to, a visual display, an indicator light, or an audio output device.

The above features and advantages and other features and advantages of the present teachings are readily apparent from the following detailed description of the best modes for carrying out the teachings when taken in connection with the accompanying drawings.

DETAILED DESCRIPTION

Figure 1:
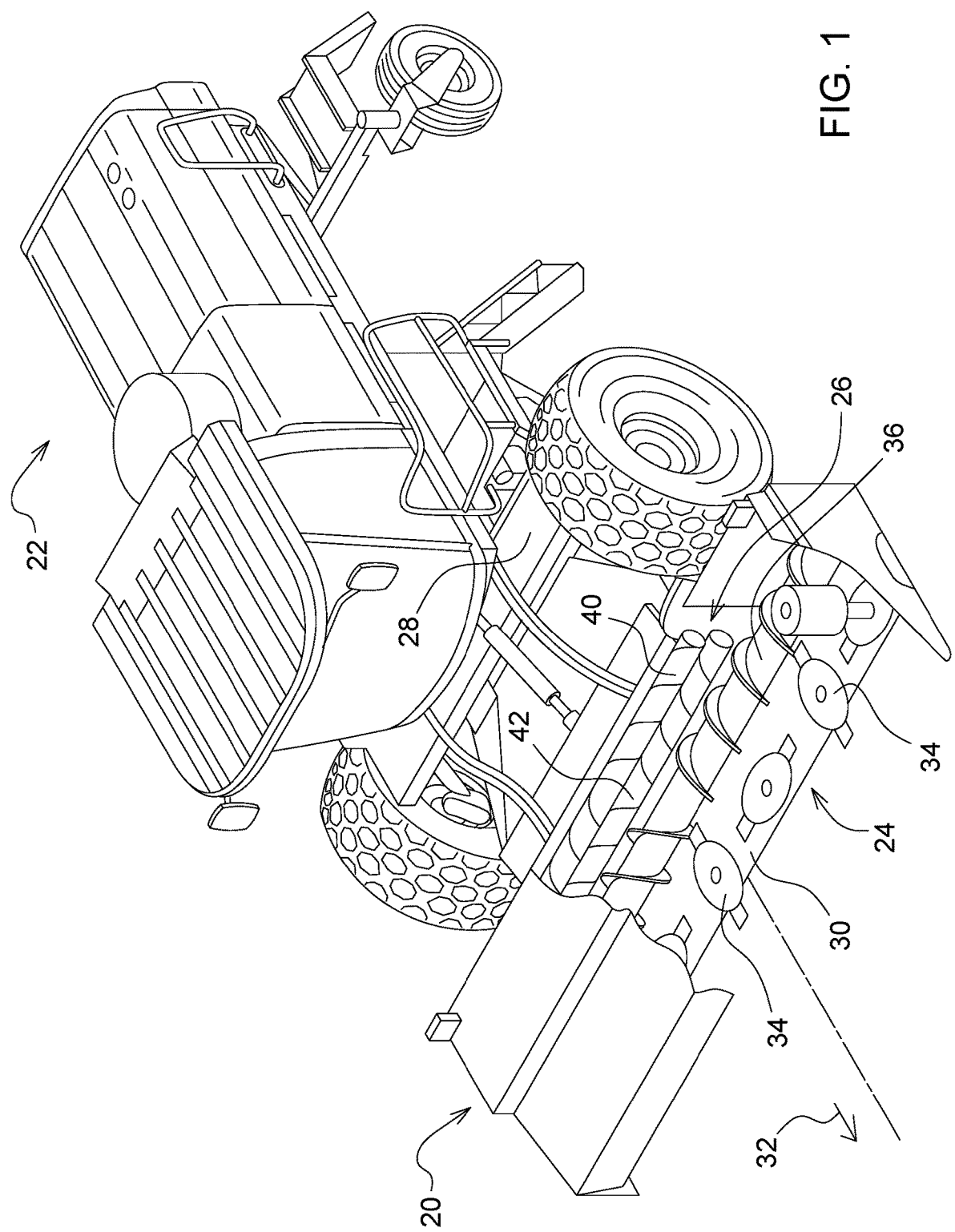
FIG. 1 is a schematic perspective view of a self-propelled windrower including a mower conditioner implement.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Referring to the Figures, wherein like numerals indicate corresponding parts throughout the several views, a mower conditioner implement is generally shown at 20. The example embodiment of the mower conditioner implement 20 shown in the Figures is configured for mounting to a forward end of an agricultural vehicle 22, such as a self-propelled windrower. However, it should be appreciated that the teachings of this disclosure may be applied to other platforms, such as but not limited to, the mower conditioner implement 20 being configured for connection to a conventional tractor, i.e., wherein the mower conditioner implement 20 is drawn behind the tractor or attached to a forward end of a conventional agricultural tractor.

The mower conditioner implement 20 includes a cutting system 24 that is operable to mow and collect standing crop material in a field, and a crop conditioning system 26 that is operable to condition cut crop material 38 as it moves through the mower conditioner implement 20 to improve its drying characteristics. The crop material may include, but is not limited to, alfalfa, grass, alfalfa grass mix, timothy, or other forages.

Figure 2:
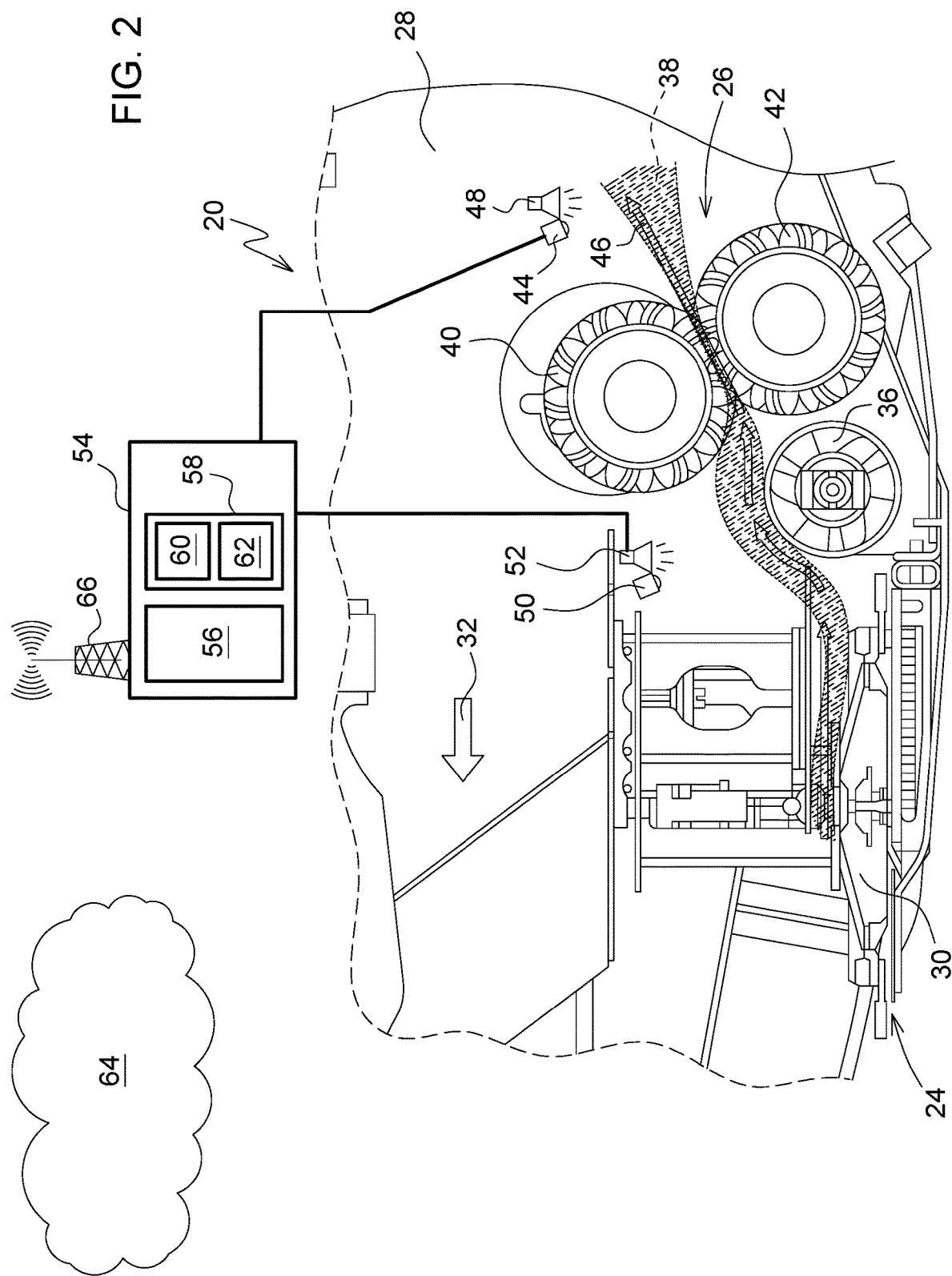
FIG. 2 is a schematic side cross sectional view of the mower-conditioner implement.

Referring to FIG. 2, the mower conditioner implement 20 includes a frame 28. The frame 28 may include, but is not limited to, the various members, panels, supports, braces, beams, etc., necessary to support the various components and systems of the mower conditioner implement 20 as described below. In one embodiment, the frame 28 may be attached to a forward end of the agricultural vehicle 22. In other embodiments, the frame 28 may be attached to the agricultural vehicle 22 with a drawbar and drawn behind the agricultural vehicle 22.

The cutting system 24 is coupled to the frame 28 and is operable to cut standing crop material in a field. The cutting system 24 may include any mechanism that is capable of cutting the crop material. As shown in the Figures, the cutting system 24 is embodied as a rotary disc cutter bar 30. However, the cutting system 24 is not limited to the example embodiment of the rotary disc cutter bar 30. As such, it should be appreciated that the cutting system 24 may vary from the example embodiment shown in the Figures and described herein.

The cutter bar 30 is supported by the frame 28. The cutter bar 30 extends along an axis that is disposed generally transverse to a direction of travel 32 of the mower conditioner implement 20. The cutter bar 30 includes a plurality of cutting discs 34 spaced along the cutter bar 30 for rotation about respective vertical axes. Each of the cutting discs 34 is coupled to an upright drive shaft to which power is coupled for causing them to rotate in appropriate directions, for delivering cut crop material 38 to an auger 36 disposed rearward of the cutting system 24.

Referring to FIG. 2, the auger 36 is rotatably mounted to the frame 28 and is disposed in front of the crop conditioning system 26. The auger 36 is positioned in front of and lower than the crop conditioning system 26. In operation, the design of the auger 36 facilitates the delivery of cut crop material 38 into the crop conditioning system 26. The cutting system 24 delivers cut crop material 38 to the auger 36, which in turn delivers the cut crop material 38 rearward for further processing by the crop conditioning system 26. The conditioned crop material is expelled rearward by the crop conditioning system 26 and may be formed into a windrow or swath by upright right and left forming panels and a swathboard. It should be appreciated that the mower conditioner implement 20 may be embodied without the auger 36, such that the cut crop material 38 is delivered directly from the cutting system 24 to the crop conditioning system 26.

The crop conditioning system 26 may include a system that processes the cut crop material 38 to bend, crimp, and/or crack open stem and stalk portions of the cut crop material 38, and/or at least partially remove a wax material from the cut crop material 38, to accelerate the release of moisture from the cut crop material 38 and reduce dry-down time of the crop material. The crop conditioning system 26 is attached to the frame 28. The example embodiment of the crop conditioning system 26 shown in the figures and described herein includes an upper conditioner roll 40 and a lower conditioner roll 42. The crop conditioning system 26 is positioned to receive the cut crop material 38 between the upper conditioner roll 40 and the lower conditioner roll 42, from the cutting system 24 as described above. While the example crop conditioning system 26 described herein and shown in the figures is embodied with opposing conditioning rolls, it should be appreciated that the crop conditioning system 26 may be embodied differently than described herein, such as but not limited to, a conditioning impeller with an associated hood.

Each of the upper conditioner roll 40 and the lower conditioner roll 42 of the crop conditioning system 26 includes a central cylindrical drum to which is attached a plurality of axially extending ribs or flutes that mesh together for conditioning the cut crop material 38 that passes between them. The mower conditioner implement 20 may include a spring-loaded link assembly that yieldably resists upward movement of the upper conditioner roll 40 caused by the cut crop material 38 passing between the upper conditioner roll 40 and the lower conditioner roll 42. The arrangement of gearing is such that the upper conditioner roll 40 and the lower conditioner roll 42 are counter-rotated, i.e., rotate in opposite rotational directions, so as to draw crop in between them.

The mower conditioner implement 20 further includes an image sensor 44. The image sensor 44 may alternatively be referred to herein as the first image sensor 44. The first image sensor 44 is positioned with a field of view to sense the crop material 38. The first image sensor 44 is operable to sense an image of the cut crop material 38. The image includes a color spectrum of the cut crop material 38. The first image sensor 44 may include, but is not limited to, a near-infrared reflectance spectrometer or a red-green-blue color sensor. The details, features, and operation of the near-infrared reflectance spectrometer and red-green-blue color sensors are known in the art, are readily available, and are therefore not specifically described in detail herein.

In the example embodiment described herein and shown in the Figures, the first image sensor 44 is disposed downstream of the crop conditioning system 26, relative to a direction of movement 46 of the cut crop material 38, such that the image sensed by the first image sensor 44 may be defined as a post-conditioned image of the cut crop material 38 discharged from the crop conditioning system 26. However, in other embodiments, it should be appreciated that the first image sensor 44 may be positioned at some other location than depicted in the Figures, for example either upstream or downstream of the crop conditioning system 26. As used herein, the term "upstream" precedes the term "downstream" along the direction of travel of the crop material 38 through the mower conditioner implement 20.

A light source 48 is associated with the image sensor 44. The light source 48 may alternatively be referred to herein as the first light source 48. The first light source 48 is operable to emit light immediately prior to the first image sensor 44 sensing the image, e.g., the post-conditioned image, such that the color spectrum of the image sensed by the first image sensor 44 includes reflected light emitted from the first light source 48. The type, features, and operation of the first light source 48 are dependent upon the specific type of sensor used for the first image sensor 44. For example, if the first image sensor 44 is a red-green-blue sensor, then the first light source 48 may include a Light Emitting Diode (LED). The LED is configured to provide intense lighting to brighten the cut crop material, thereby allowing for good imagery to enable Neural Networks to analyze the image sensed by the first image sensor 44. In other embodiments, if the first image sensor 44 is embodied as a near-infrared reflectance spectrometer, then the first light source 48 may include a device that emits light in the near-infrared region of the electromagnetic spectrum, between approximately 780 nm to 2500 nm. The first light source 48 may include, but is not limited to, an LED or an incandescent or quartz halogen light bulb.

The mower conditioner implement 20 may further include a second image sensor 50. In the example embodiment shown in the figures and described herein, the second image sensor 50 is disposed downstream of the cutting system 24 and upstream of the crop conditioning system 26, relative to the direction of movement 46 of the cut crop material 38. The second image sensor 50 is operable to sense a pre-conditioned image having a color spectrum of the cut crop material 38 discharged from the cutting system 24 and prior to entering the crop conditioning system 26. The pre-conditioned image includes a color spectrum of the cut crop material 38 prior to conditioning. The second image sensor 50 may include, but is not limited to, a near-infrared reflectance spectrometer or a red-green-blue color sensor. The details, features, and operation of the near-infrared reflectance spectrometer and red-green-blue color sensors are known in the art, are readily available, and are therefore not specifically described in detail herein.

A second light source 52 may be included and associated with the second image sensor 50. The second light source 52 is operable to emit light immediately prior to the second image sensor 50 sensing the pre-conditioned image, such that the color spectrum of the pre-conditioned image includes reflected light emitted from the second light source 52. The type, features, and operation of the second light source 52 are dependent upon the specific type of sensor used for the second image sensor 50. For example, if the second image sensor 50 is a red-green-blue sensor, then the second light source 52 may include a Light Emitting Diode (LED). The LED is configured to provide intense lighting to brighten the cut crop material, thereby allowing for good imagery to enable Neural Networks to analyze the image sensed by the second image sensor 50. In other embodiments, if the second image sensor 50 is embodied as a near-infrared reflectance spectrometer, then the second light source 52 may include a device that emits light in the near-infrared region of the electromagnetic spectrum, between approximately 780 nm to 2500 nm. The second light source 52 may include, but is not limited to, an LED or an incandescent or quartz halogen light bulb.

In the example embodiment shown in the Figures and described herein, the first light source 48 and the second light source 52 are separate and independent of each other. However, in other embodiments, it is contemplated that the first light source 48 and the second light source 52 may be a single light source 48 that is configured to emit light for both the first image sensor 44 and the second image sensor 50.

The mower conditioner implement 20 may further include a computing device 54. The computing device 54 may be integral with the mower conditioner implement 20, may be integral with the vehicle 22 and connected to the mower-conditioner implement, or may be located remote from both the vehicle 22 and the mower conditioner implement 20. Accordingly, it should be appreciated that the computing device 54 of the mower conditioner implement 20 may be located remotely from the other components of the mower conditioner implement 20. The computing device 54 is disposed in communication with and operable to control and/or receive data from the first image sensor 44, the second image sensor 50, the first light source 48, and the second light source 52. It should be appreciated that the computing device 54 may be disposed in communication with and operable to control other components of the mower conditioner implement 20 as well, such as but not limited to the cutting system 24 and/or the crop conditioning system 26.

The computing device 54 may alternatively be referred to as a controller, a computer, a module, a control unit, etc. In some embodiments, the computing device 54 may be operable to automatically control the operation of the mower conditioner implement 20. In other embodiments, the computing device 54 is operable to receive data from the first image sensor 44 and the second image sensor 50, analyze the data, and provide feedback to an operator of the mower conditioner implement 20.

The computing device 54 includes a processor 56, a memory 58, and all software, hardware, algorithms, connections, sensors, etc., necessary to manage and control the operation of the mower conditioner implement 20 as described herein. As such, a method may be embodied as a program or algorithm operable on the computing device 54. It should be appreciated that the computing device 54 may include a device capable of analyzing data from various sensors, comparing data, making decisions, and executing the tasks described herein.

The computing device 54 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (ND) circuitry, digital-to-analog (D/A) circuitry, and any required input/output (I/O) circuitry, I/O devices, and communication interfaces, as well as signal conditioning and buffer electronics.

The computer-readable memory 58 may include any non-transitory/tangible medium which participates in providing data or computer-readable instructions. The memory 58 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The computing device 54 includes the tangible, non-transitory memory 58 on which are recorded computer-executable instructions, including a crop analysis algorithm 60. The processor 56 of the computing device 54 is operable to execute the crop analyses algorithm. The crop analysis algorithm 60 implements a method of monitoring the cut crop material 38 and controlling the mower conditioner implement 20 to optimize the cutting and conditioning of the crop material.

In the example embodiment described herein, the computing device 54, i.e., the processor 56 which executes the crop analysis algorithm 60, controls the first light source 48 and the first image sensor 44 to sense an image, e.g., the post-conditioned image of the crop material. If the mower conditioner implement 20 is equipped with the second image sensor 50, such as the example embodiment described herein, then the computing device 54 may further control the second light source 52 and the second image sensor 50 to sense an image, e.g., the pre-conditioned image of the crop material.

The computing device 54 compares the color spectrum of the image sensed by the first image sensor 44, e.g., the post-conditioned image, to a calibrated color measurement 62 in order to determine at least one of an ash content in the cut crop material 38, or a degree of stem conditioning of the cut crop material 38. The ash content is a measurement of the amount of ash in the cut crop material 38 per unit volume or unit weight of cut crop material 38. The ash content may be expressed in terms of a percentage, in terms of weight or parts per unit volume, in terms of weight or parts per unit weight, or in some other manner. The ash may be defined as and/or include particles of solid material left after burning a combustible material. The ash may include, for example, particulate matter spread onto a field, such as by volcanic activity, wildfires, etc.

The degree of stem conditioning is a measurement of the amount of conditioning applied to the stem of the crop material. As noted above, the terms "conditioning", "stem conditioning", "crop conditioning", and/or "conditioned crop material" include processing the cut crop material 38 to bend, crimp, abrade, and/or crack open stem and stalk portions of the cut crop material 38, and/or at least partially remove a wax material from the cut crop material 38, to accelerate the release of moisture from the cut crop material 38 and reduce dry-down time of the crop material. The crop material may have an optimum level of crop conditioning. The optimum level of crop conditioning may depend on the specific type of crop, the geographic location of the crop, the type of crop conditioning system 26, the type of cutting system 24, etc. The "degree of stem conditioning" is a measurement between no stem conditioning and the optimum level of stem conditioning. As used herein, the term "optimum level of stem conditioning" is the amount of stem conditioning that provides the quickest dry-down time with the highest nutrient content for the specific crop, field, weather conditions, etc. Stem conditioning includes the damage done to the stem of the crop material, including the crushing, breaking, or abrading of the stem. The degree of stem conditioning may be expressed as a percentage of the stem that is damaged or conditioned, but may alternatively be expressed in some other manner, such as but not limited to number of damage locations per unit length of stem.

The color spectrum of the crop material captured in the images sensed by the first image sensor 44 and/or the second image sensor 50 is dependent upon the light emitted from the first light source 48 and/or the second light source 52 and reflected off of the crop material. The specific characteristics of the crop material, such as ash, crimps or cracks in the stalk or stem portions, etc., reflect light from the first light source 48 and/or the second light source 52 in a specific respective color, which is unique to each crop characteristic. These specific respective colors may be correlated to the specific characteristics of the crop generating the respective colors to define the calibrated color measurement 62. As such, by examining the color spectrum of the images, the different characteristics of the crop material may be identified by comparing the reflected light captured in the images to the calibrated color measurement 62. For example, a specific ash content will reflect light from the first light source 48 and/or the second light source 52 in a certain color or color range. The calibrated color measurement 62 is defined to correlate the certain color or color range to that specific ash content. As such, when the computing device 54 analyzes an image and recognizes a specific color or color range, for example, a specific color for a defined ash content, the computing device 54 may use the calibrated color measurement 62 to correlate that specific color or color range to the associated specific crop characteristic, for example, the specific ash content associated with that color.

If the mower conditioner implement 20 is only equipped with the first image sensor 44, then the computing device 54 directly compares the color spectrum to the calibrated color measurement 62. However, if the mower conditioner implement 20 includes the second image sensor 50, such as the example embodiment described herein, then the computing device 54 may determine a color difference between the color spectrum of the pre-conditioned image and the color spectrum of the post-conditioned image, and then compare the color difference to the calibrated color measurement 62 to determine the at least one of the ash content of the cut crop material 38 or the degree of stem conditioning of the cut crop material 38. By doing so, the computing device 54 may determine the amount of change in the crop characteristic, such as the degree of stem conditioning, that has occurred between the pre-conditioned image and the post-conditioned image. Notably, the computing device 54 is not sensing the degree of moisture in the crop material, but is instead sensing the amount of damage done to the stem portions of the crop material, i.e., the stem conditioning. Alternatively, the computing device 54 may analyze or compare the respective color spectrum for each of the pre-conditioned image and the post conditioned image to the calibrated color measurement 62, and then compare the results to determine a change in the crop characteristic between the pre-conditioned image and the post-conditioned image.

In one example embodiment, the computing device 54 may associate at least one of the pre-conditioned image and the post-conditioned image with data related to the location, date, and time that the pre-conditioned image and the post-conditioned image were sensed respectively. The image and the associated location data, date data, and/or time data may be defined as a geo-referenced data set and saved in the memory 58 of the computing device 54. The computing device 54 may then communicate the geo-referenced data set to a remote data storage system 64 for future use. The remote data storage system 64 may include, but is not limited to, a cloud based server system or some other offsite system capable of storing and transmitting data through an internet connection. The geo-referenced data set may be used in the future for making management decisions related to the geo-referenced data set and/or operating settings for the mower conditioner implement 20 for future operations.

Once the computing device 54 has determined the ash content or the degree of stem conditioning, then the computing device 54 may communicate a signal, indicating the determined ash content or the determined degree of crop conditioning, to a communicator 66. The communicator 66 may include a device capable of communicating a message. For example, the communicator 66 may include, but is not limited to, a visual display device, a warning light, an audio output device, etc. The visual display device may include, but is not limited to, a monitor, a touch screen display, or some other similar device. The audio output device may include a speaker, etc. The communicator 66 may include a device that is located on the vehicle 22, or that is remote from the vehicle 22, such as a mobile hand held device.

Additionally, once the computing device 54 has determined at least one of the ash content or the degree of stem conditioning, then the computing device 54 may adjust at least one of the cutting system 24 or the crop conditioning system 26 based on the determined ash content or the determined degree of stem conditioning. The computing device 54 may adjust components of the mower conditioner implement 20 either automatically, or indirectly by notifying an operator and/or providing a suggested adjustment.

For example, the computing device 54 may compare the determined ash content to a maximum allowable ash threshold to determine if the determined ash content is less than or equal to the maximum allowable ash threshold, or if the determined ash content is greater than the maximum allowable ash threshold. When the determined ash content is greater than the maximum allowable ash threshold, then the computing device 54 may automatically control a cut height of the cutting system 24 relative to a ground surface, or communicate a message to the operator suggesting that the cut height be adjusted. Similarly, When the determined ash content is greater than the maximum allowable ash threshold, then the computing device 54 may automatically control a cutting speed of the cutting system 24 or communicate a message to the operator suggesting that the cutting speed be adjusted, or the computing device 54 may automatically control a fore/aft tilt angle of the cutting system 24 relative to the ground surface or communicate a message to the operator suggesting that the fore/aft tilt angle be adjusted. In another example, based on the determined degree of stem conditioning, the computing device 54 may automatically control a conditioning speed of the crop conditioning system 26, control a conditioning pressure of the crop conditioning system 26, or communicate a message to the operator suggesting that the conditioning speed, or the conditioning pressure be adjusted.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A mower conditioner implement comprising:
a cutting system operable to cut crop material;
a crop conditioning system operable to receive the cut crop material from the cutting system and condition the cut crop material;
an image sensor positioned to sense an image of the crop material, the image having a color spectrum;
a computing device having a processor and a memory having a crop analysis algorithm stored thereon, wherein the processor is operable to execute the crop analysis algorithm to:
compare the color spectrum of the image to a calibrated color measurement to determine a degree of stem conditioning of the cut crop material; and
adjust the crop conditioning system based on the determined degree of stem conditioning.

2. The mower conditioner implement set forth in claim 1, further comprising a light source associated with the image sensor, wherein the light source is operable to emit light immediately prior to the image sensor sensing the image, such that the color spectrum of the image includes reflected light emitted from the light source.

3. The mower conditioner implement set forth in claim 1, wherein the image sensor is disposed downstream of the crop conditioning system relative to a direction of movement of the cut crop material, such that the image sensed by the image sensor is a post-conditioned image of the cut crop material discharged from the crop conditioning system.

4. The mower conditioner implement set forth in claim 3, further comprising a second image sensor disposed downstream of the cutting system and upstream of the crop conditioning system relative to the direction of movement of the cut crop material, wherein the second image sensor is operable to sense a pre-conditioned image having a color spectrum of the cut crop material discharged from the cutting system and prior to entering the crop conditioning system.

5. The mower conditioner implement set forth in claim 4, wherein the processor is operable to execute the crop analysis algorithm to determine a color difference between the color spectrum of the pre-conditioned image and the color spectrum of the post-conditioned image.

6. The mower conditioner implement set forth in claim 4, wherein the processor is operable to execute the crop analysis algorithm to compare the color difference to the calibrated color measurement to determine the degree of stem conditioning of the cut crop material.

7. The mower conditioner implement set forth in claim 4, wherein the processor is operable to execute the crop analysis algorithm to associate at least one of the pre-conditioned image and the post-conditioned image with data related to the location, date, and time that the pre-conditioned image and the post-conditioned image were sensed respectively to define a geo-referenced data set.

8. The mower conditioner implement set forth in claim 7, wherein the processor is operable to execute the crop analysis algorithm to communicate the geo-referenced data set to a remote data storage system.

9. The mower conditioner implement set forth in claim 4, wherein each of the image sensor and the second image sensor includes at least one of a near-infrared sensor or a red-green-blue color sensor.

10. The mower conditioner implement set forth in claim 4, further comprising a second light source associated with the second image sensor, wherein the second light source is operable to emit light immediately prior to the second image sensor sensing the pre-conditioned image, such that the color spectrum of the pre-conditioned image includes reflected light emitted from the second light source.

11. The mower conditioner implement set forth in claim 1, wherein the processor is operable to execute the crop analysis algorithm to control a conditioning speed of the crop conditioning system based on the determined degree of stem conditioning.

12. The mower conditioner implement set forth in claim 1, wherein the processor is operable to execute the crop analysis algorithm to control a conditioning pressure of the crop conditioning system based on the determined degree of stem conditioning.

13. The mower conditioner implement set forth in claim 1, wherein the processor is operable to execute the crop analysis algorithm to generate and communicate a signal, indicating the determined ash content or the determined degree of crop conditioning, to a communicator.

14. A mower conditioner implement comprising:
a cutting system operable to cut crop material;
a crop conditioning system operable to receive the cut crop material from the cutting system and condition the cut crop material;
a first light source operable to emit light;
a first image sensor associated with the first light source, wherein the first image sensor is disposed downstream of the crop conditioning system relative to a direction of movement of the cut crop material, and wherein the first image sensor is operable to sense a post-conditioned image having a color spectrum of the cut crop material discharged from the crop conditioning system, with the color spectrum of the post-conditioned image including reflected light emitted from the first light source immediately prior to the first image sensor sensing the post-conditioned image;
a second light source operable to emit light;
a second image sensor associated with the second light source, wherein the second image sensor is disposed downstream of the cutting system and upstream of the crop conditioning system relative to the direction of movement of the cut crop material, and wherein the second image sensor is operable to sense a pre-conditioned image having a color spectrum of the cut crop material discharged from the cutting system, with the color spectrum of the pre-conditioned image including reflected light emitted from the second light source immediately prior to the second image sensor sensing the post-conditioned image;
a computing device having a processor and a memory having a crop analysis algorithm stored thereon, wherein the processor is operable to execute the crop analysis algorithm to:
compare the color spectrum of the pre-conditioned image and the post-conditioned image to a calibrated color measurement to determine a degree of stem conditioning of the cut crop material; and
adjust the crop conditioning system based on the determined degree of stem conditioning.

15. The mower conditioner implement set forth in claim 14, wherein the first light source and the second light source are separate and independent of each other.

16. The mower conditioner implement set forth in claim 14, wherein the processor is operable to execute the crop analysis algorithm to determine a color difference between the color spectrum of the pre-conditioned image and the color spectrum of the post-conditioned image, and compare the color difference to the calibrated color measurement to determine the degree of stem conditioning of the cut crop material.

17. The mower conditioner implement set forth in claim 14, wherein the processor is operable to execute the crop analysis algorithm to:
control a conditioning speed of the crop conditioning system based on the determined degree of stem conditioning; or
control a conditioning pressure of the crop conditioning system based on the determined degree of stem conditioning.

* * * * *